US008701459B2

(12) United States Patent
Geen

(10) Patent No.: US 8,701,459 B2
(45) Date of Patent: Apr. 22, 2014

(54) APPARATUS AND METHOD FOR CALIBRATING MEMS INERTIAL SENSORS

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 299 days.

(21) Appl. No.: 12/907,474

(22) Filed: Oct. 19, 2010

(65) Prior Publication Data

US 2011/0167891 A1 Jul. 14, 2011

Related U.S. Application Data

(60) Provisional application No. 61/253,307, filed on Oct. 20, 2009, provisional application No. 61/347,861, filed on May 25, 2010.

(51) Int. Cl.
*G01P 21/00* (2006.01)
*G01P 15/08* (2006.01)
*G01P 15/14* (2013.01)

(52) U.S. Cl.
USPC ................ 73/1.38; 73/504.04; 73/504.12

(58) Field of Classification Search
USPC ............ 73/1.37, 1.38, 504.3, 504.02, 504.04, 73/504.12, 514.01, 514.02
See application file for complete search history.

(56) References Cited

U.S. PATENT DOCUMENTS

| 2,309,853 | A | 2/1943 | Lyman et al. | 33/204 |
|---|---|---|---|---|
| 2,513,340 | A | 7/1950 | Lyman | 264/1 |
| 4,267,478 | A | 5/1981 | Ljung et al. | 310/315 |
| 4,755,057 | A | 7/1988 | Curby et al. | 356/350 |
| 4,884,446 | A | 12/1989 | Ljung | 73/505 |
| 5,025,346 | A | 6/1991 | Tang et al. | 361/283 |
| 5,034,905 | A | 7/1991 | Widdau et al. | 364/606 |
| 5,275,047 | A | 1/1994 | Zabler et al. | 73/505 |
| 5,349,855 | A | 9/1994 | Bernstein et al. | 73/505 |
| 5,359,893 | A | 11/1994 | Dunn | 73/505 |
| 5,392,650 | A | 2/1995 | O'Brien et al. | 73/517 |
| 5,635,640 | A | 6/1997 | Geen | 73/504.12 |
| 5,650,568 | A * | 7/1997 | Greiff et al. | 73/504.09 |
| 5,869,760 | A | 2/1999 | Geen | 73/504.12 |
| 5,939,633 | A | 8/1999 | Judy | 73/514.32 |
| 5,992,233 | A | 11/1999 | Clark | 73/514.35 |
| 6,122,961 | A | 9/2000 | Geen et al. | 73/504.12 |
| 6,370,954 | B1 | 4/2002 | Zerbini et al. | 73/514.01 |
| 6,505,511 | B1 | 1/2003 | Geen et al. | 73/504.12 |
| 6,553,833 | B1 | 4/2003 | Funk et al. | 73/504.14 |

(Continued)

OTHER PUBLICATIONS

Ashwin A. Seshia, Roger T. Howe, and Stephen Montague. "An Integrated Microelectromechanical Resonant Output Gyroscope." Proceedings, 15th IEEE Micro Electro Mechanical Systems Conference, 2002.*

(Continued)

*Primary Examiner* — Randy W Gibson
*Assistant Examiner* — Natalie Huls
(74) *Attorney, Agent, or Firm* — Sunstein Kann Murphy & Timbers LLP

(57) ABSTRACT

The transduction scale factor for a MEMS gyroscope is calibrated without moving the MEMS device based on measurements of the resonator resonance frequency and the accelerometer resonance frequency as well as a distance value that may be a fixed distance value or a measured distance value. The measured distance value may be obtained by measuring the quality factor of the resonator or accelerometer and deriving the measured distance value from the quality factor measurement.

20 Claims, 6 Drawing Sheets

(56) References Cited

U.S. PATENT DOCUMENTS

| | | | |
|---|---|---|---|
| 6,564,637 B1 | 5/2003 | Schalk et al. | 73/504.12 |
| 6,629,448 B1* | 10/2003 | Cvancara | 73/1.38 |
| 6,654,424 B1 | 11/2003 | Thomae et al. | 375/257 |
| 6,837,107 B2 | 1/2005 | Geen | 73/504.04 |
| 6,877,374 B2 | 4/2005 | Geen | 73/504.14 |
| 6,892,576 B2 | 5/2005 | Samuels et al. | 73/514.32 |
| 7,032,451 B2 | 4/2006 | Geen | 73/504.14 |
| 7,051,590 B1 | 5/2006 | Lemkin et al. | 73/504.04 |
| 7,210,337 B1* | 5/2007 | Jarrett | 73/49.3 |
| 7,240,533 B2* | 7/2007 | Fell et al. | 73/1.38 |
| 7,421,897 B2 | 9/2008 | Geen et al. | 73/504.12 |
| 7,726,188 B2* | 6/2010 | Cardarelli | 73/504.13 |
| 2002/0174720 A1* | 11/2002 | Cardarelli | 73/504.02 |
| 2004/0211257 A1 | 10/2004 | Geen | 73/504.04 |
| 2005/0081633 A1 | 4/2005 | Nasiri et al. | 73/514.29 |
| 2005/0205959 A1 | 9/2005 | Chau et al. | 257/467 |
| 2006/0150745 A1 | 7/2006 | Lang | 73/849 |
| 2006/0201233 A1* | 9/2006 | Schroeder | 73/1.77 |
| 2007/0119258 A1* | 5/2007 | Yee | 73/649 |
| 2008/0282833 A1 | 11/2008 | Chaumet | 74/5 R |
| 2011/0146402 A1* | 6/2011 | Donadel et al. | 73/504.12 |

OTHER PUBLICATIONS

Chihwan Jeong, Seonho Seok, Byeungleul Lee, Hyeonched Kim, and Kukjin Chun. "A Study on Resonant Frequency and Q FActor Tunings for MEMS Vibratory Gyroscopes." Journal of Micromechanics and Microengineering, v. 14, pp. 1530-1536, (2004).*

Geen et al., "New iMEMS® Angular—Rate—Sensing Gyroscope," Analog Dialogue 37-03, pp. 1-4 (2003).

Saukoski, "System and Circuit Design for a Capacitive MEMS Gyroscope," Doctoral Dissertation, TKK Dissertations 116, Helsinki University of Technology, 279 pages (2008).

* cited by examiner

APPARATUS AND METHOD FOR CALIBRATING MEMS INERTIAL SENSORS

CROSS-REFERENCE TO RELATED APPLICATION(S)

This patent application claims the benefit of U.S. Provisional Patent Application No. 61/253,307 filed Oct. 20, 2009 and also claims the benefit of U.S. Provisional Patent Application No. 61/347,861 filed May 25, 2010, each of which is hereby incorporated herein by reference in its entirety.

FIELD OF THE INVENTION

The present invention relates generally to MEMS devices and, more particularly, to calibrating MEMS inertial sensors.

BACKGROUND OF THE INVENTION

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., *New iMEMS Angular-Rate-Sensing Gyroscope*, Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

Before a MEMS gyroscope is sold, it generally must be calibrated in order to confirm the relationship between angular motion and corresponding electrical outputs produced by the gyroscope. This calibration of the transduction from angular motion to electrical output (i.e., the transduction scale factor) typically involves mounting the gyroscope to a movable mechanism and measuring the electrical outputs produced by known angular rate inputs. Calibration may be performed multiple times, for example, at the wafer level and again after final packaging, since the transduction scale factor can change during manufacturing. Calibration of the transduction scale factor is time-consuming and can be one of the most expensive elements in manufacturing cost.

SUMMARY OF THE INVENTION

In accordance with one aspect of the invention there is provided a method for calibrating a MEMS gyroscope having resonator and an accelerometer, the resonator including at least one shuttle that resonates in a device plane above an underlying substrate and deflects out-of-plane, the accelerometer configured to sense such out-of-plane motion. The method involves measuring a resonance frequency of the resonator; measuring a resonance frequency of the accelerometer; and producing a transduction scale factor value for the MEMS gyroscope based on the resonance frequency of the resonator and the resonance frequency of the accelerometer.

In accordance with another aspect of the invention there is provided a calibration device for calibrating a MEMS gyroscope having resonator and an accelerometer, the resonator including at least one shuttle that resonates in a device plane above an underlying substrate and deflects out-of-plane, the accelerometer configured to sense such out-of-plane motion. The calibration device includes a first frequency measurement subsystem configured to measure a resonance frequency of the resonator; a second frequency measurement subsystem configured to measure a resonance frequency of the accelerometer; and a transduction scale factor generator configured to produce a transduction scale factor value for the MEMS gyroscope based on the resonance frequency of the resonator and the resonance frequency of the accelerometer.

In various alternative embodiments, measuring the resonance frequency of the resonator may involve inducing movement of the at least one shuttle substantially within the device plane. Similarly, measuring the resonance frequency of the accelerometer may involve inducing out-of-plane movement of the at least one shuttle.

Producing the transduction scale factor value may involve producing the transduction scale factor value based on the resonance frequency of the resonator, the resonance frequency of the accelerometer, and a fixed distance value representing the nominal distance between the at least one shuttle and corresponding accelerometer sense electrodes on the underlying substrate. Alternatively, producing the transduction scale factor value may involve measuring a distance between the at least one shuttle and corresponding accelerometer sense electrodes on the underlying substrate to produce a measured distance value and producing the transduction scale factor value based on the resonance frequency of the resonator, the resonance frequency of the accelerometer, and the measured distance value. Measuring the distance may involve measuring a quality factor of the resonator or accelerometer and producing the measured distance value based on the measured quality factor.

The transduction scale factor value may be stored in a memory of the MEMS device. Additionally, or alternatively, the transduction scale factor may be compared with a transduction scale factor value previously stored in a memory of the MEMS device. Such comparison may be used, for example, to determine whether the MEMS device passes or fails a test. An output may be produced to indicate whether the MEMS device passes or fails the test, e.g., on a display device.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A set includes one or more members.

An "electrode" is a structure through which an electrical or electromechanical effect is applied and/or sensed. In exemplary embodiments, various electrodes are used for applying and/or sensing electrical or electromechanical effects through capacitive coupling, although it should be noted that other types of electrodes and couplings may be used (e.g., piezoelectric).

The term "quality factor" or "Q-factor" or simply "Q" denotes a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. A system with a high Q resonates with a greater amplitude (at the resonant frequency) than one with a low Q factor, and its response falls off more rapidly as the frequency moves away from resonance.

In embodiments of the present invention, velocity feedback electrodes of a MEMS gyroscope are configured such that the transductions of shuttle velocity and Coriolis motion to electrical signals are governed by similar structural features and are subject, in the same way, to the same manufacturing tolerances. Then, the effect of those tolerances in producing uncertainty of scale factor can be cancelled either by forming the quotient of the velocity and Coriolis signals (essentially measuring the Coriolis signal with respect to velocity) or, equivalently, by measuring each with respect to the same electrical reference and servoing the velocity to constancy. Thus, in embodiments of the present invention, the transduction scale factor of a MEMS gyroscope is calibrated based on measurements of the shuttle and accelerometer resonance frequencies and optionally also based on measurement of the quality factor (Q) of the shuttle or accelerometer, without physical movement of the gyroscope.

Figure 1:
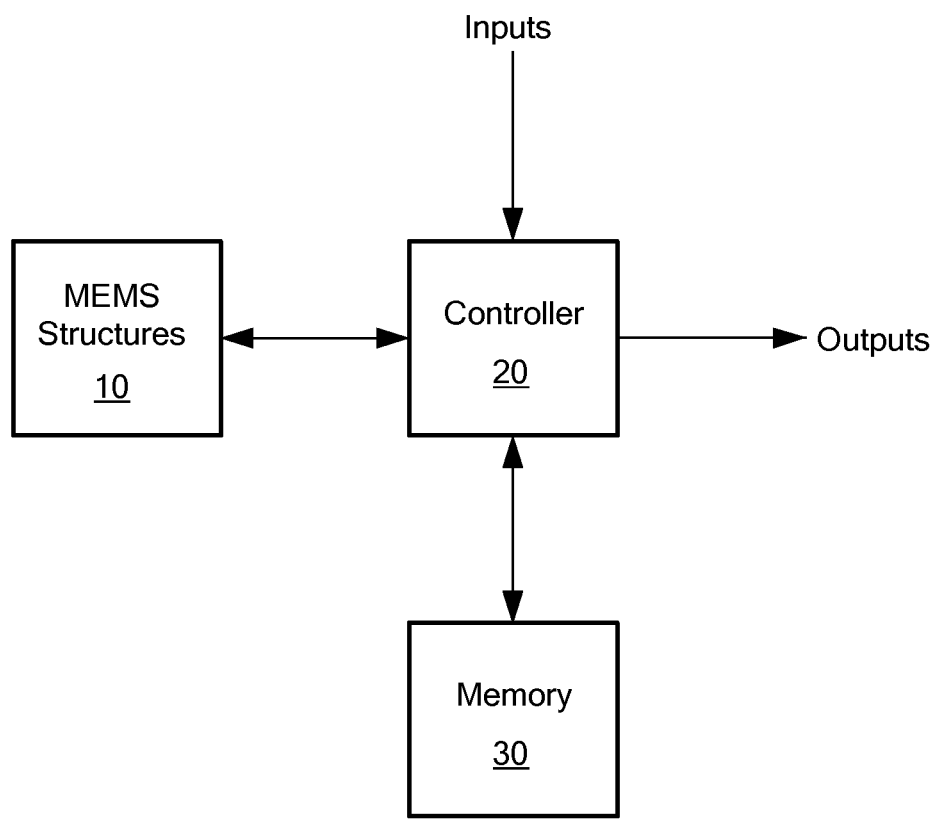
FIG. 1 is a schematic diagram conceptually showing relevant components of a MEMS device, in accordance with an exemplary embodiment of the present invention.

FIG. 1 is a schematic diagram conceptually showing relevant components of a MEMS device, in accordance with an exemplary embodiment of the present invention. Among other things, the MEMS device includes various MEMS structures 10, a controller 20 coupled to the MEMS structures 10, and a memory 30 coupled to the controller 20. Generally speaking, a MEMS device includes at least one movable structure (referred to hereinafter for convenience as a "proof mass"), although some MEMS devices (e.g., convective accelerometers as described in U.S. patent application publication number US2005/0205959, which is assigned to Analog Devices, Inc. of Norwood, Mass. and is hereby incorporated herein by reference in its entirety) may have no overtly moving parts. In any case, a MEMS device may be a MEMS-only device (i.e., with structure only), or an integrated MEMS having both structure and circuitry, such as an IMEMS™ inertial sensor manufactured by Analog Devices, Inc. of Norwood, Mass.

With reference again to FIG. 1, in MEMS devices such as MEMS gyroscopes and accelerometers (e.g., as discussed in U.S. Pat. Nos. 6,505,511, 6,877,374, 7,421,897, 5,635,640, 5,939,633, and 6892576, which are assigned to Analog Devices, Inc. of Norwood, Mass. and are hereby incorporated herein by reference in their entireties), the MEMS structures 10 typically include various types of drive and/or sense structures including mechanical moving parts (e.g., resonator shuttles, sensor frames, etc.) with low electrical impedance and high signal voltages adjacent to sensitive parts (e.g., fixed sensing structures, referred to hereinafter as sense electrodes) with high impedance. Movement of such moving parts is detected by low level signals induced in the sense electrodes due to changes in capacitance between the moving parts and the sense electrodes. The controller 20 provides electrical connections to the various MEMS structures, e.g., for driving and/or sensing movement of a movable mass. The controller 20 receives various inputs (e.g., power signals from a power supply, temperature signals from the temperature sensor) and provides various outputs (e.g., output signals representing movement of the MEMS device). Also, the controller 20 obtains various types of operating parameters from the memory 30, e.g., a transduction scale factor used to convert sensed signals to device outputs.

Figure 2:
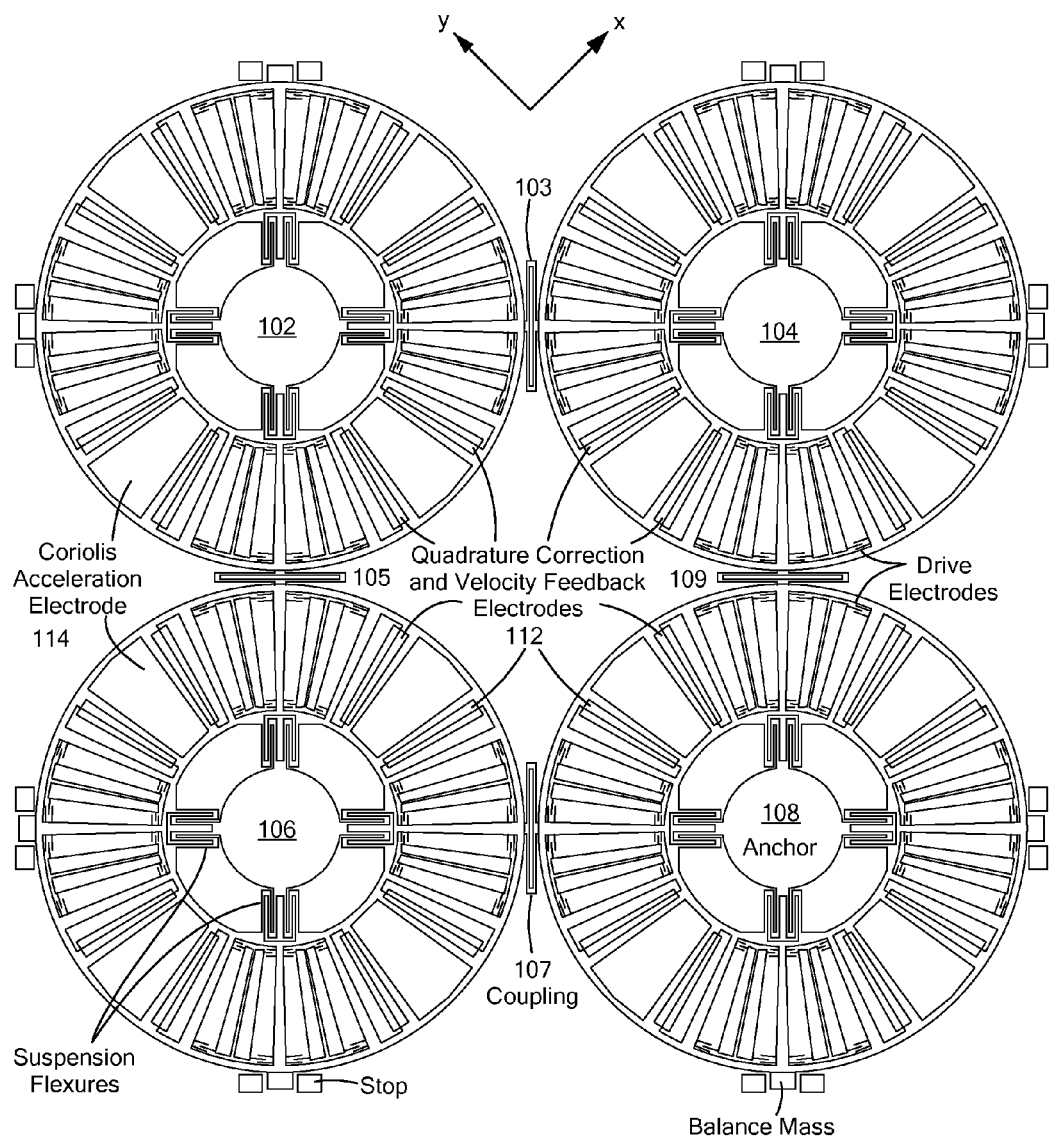
FIG. 2 is a schematic diagram of an X-Y axis gyroscope 100 in accordance with one exemplary embodiment of the present invention.

FIG. 2 is a schematic diagram of an X-Y axis gyroscope 100 in accordance with one exemplary embodiment of the present invention. This vibratory gyroscope operates under principles disclosed in U.S. Pat. Nos. 5,635,640, 5,869,760, and 6,837,107, each of which is hereby incorporated herein by reference in its entirety. Specifically, this vibratory gyroscope includes various micromachined gyroscope structures in a device layer (plane) oriented above an underlying substrate having various substrate layer structures. The axes labeled "x" and "y" represent the axes about which Coriolis acceleration is sensed (i.e., the gyroscope sensing axes). Reference is also made to "z" axes normal to the x-y plane.

As shown in FIG. 2, this exemplary gyroscope 100 includes four rotationally-dithered masses (referred to hereinafter as shuttles) arranged in a fully-coupled cross-quad configuration, with each pair of adjacent shuttles interconnected by a coupling (referred to hereinafter as a fork) that, among other things, ensures that the shuttles resonate substantially in anti-phase with one another within the device plane. Specifically, shuttles 102 and 104 are interconnected by fork 103, shuttles 102 and 106 are interconnected by fork 105, shuttles 106 and 108 are interconnected by fork 107, and shuttles 104 and 108 are interconnected by fork 109.

The shuttles are typically driven with signals derived (either directly or via a phase-locked loop) from a velocity feedback signal. That signal can also be used to stabilize the Coriolis response against thermal or other perturbations either by post-processing to form a quotient or servoing the magnitude of the velocity to a constant value. Among other things, phase-locked operation of the shuttles generally simplifies the overall electronics, thereby saving cost and complexity. It also tends to avoid interference problems from relative drift of clock edges and beat frequencies. Furthermore, such interconnection of the shuttles generally obviates the need for costly mounting isolation because, among other things, motor vibration momenta tends to be cancelled locally so as to desensitize the resonators to mounting losses.

When the shuttles are resonating, out-of-plane movements of the shuttles, caused predominantly by Coriolis forces as the gyroscope is rotated about the x and/or y axes, are sensed by various Coriolis sensing electrodes 114 arranged on the underlying substrate. In this exemplary embodiment, four Coriolis sensing electrodes are arranged under each shuttle (for convenience, only two of these electrodes are highlighted in the figure).

The gyroscope 100 typically includes various other types of structures such as drive electrodes 110 for driving resonance of the shuttles (for convenience, only two drive electrodes are highlighted in the figure) and quadrature correction and velocity feedback electrodes 112 (for convenience, only eight of these electrodes are highlighted in the figure). In typical embodiments, these electrodes are electrostatically coupled with corresponding resonator structures, although other types of couplings may be used in various alternative embodiments (e.g., piezoelectric drivers/sensors). These types of structures, as well as related circuitry, are known in the art.

Figure 3:
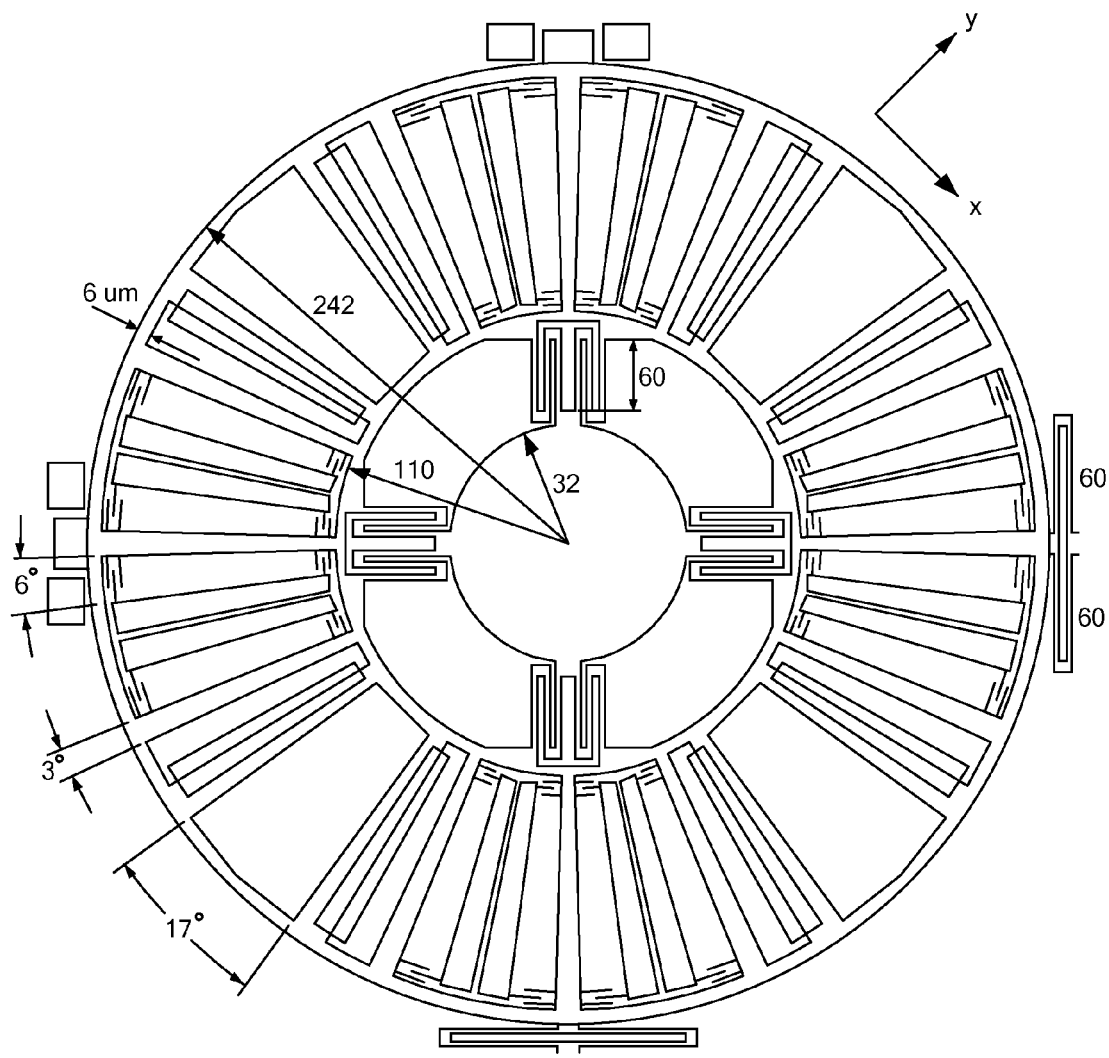
FIG. 3 shows a more detailed view of one quadrant of the gyroscope shown in FIG. 2.

FIG. 3 shows a more detailed view of one quadrant of the gyroscope 100 shown in FIG. 2. The dimensions shown are in micrometers (which may be abbreviated as "um" below). In this configuration, the Coriolis current from one axis of the quad XY gyroscope, which arises from tiny differential variations in structure-to-electrode separation by tilting about the axes, can be estimated as follows:

$$ic = \frac{16}{3} \cdot \varepsilon \cdot (V - Vt) \cdot \left(\frac{ro^3 - ri^3}{h^2}\right) \cdot \alpha \cdot \frac{\omega \cdot \Omega z}{\omega xy^2 - \omega^2} \qquad \text{Eq. 1}$$

where $\varepsilon$ is permittivity, V is the structure voltage, Vt is the electrode voltage, ro is the outer electrode radius, ri is the inner electrode radius, h is the effective separation of the electrode and structure, $\alpha$ is the angular width of the electrode (which equals L/ro), $\Omega z$ is the angular velocity of the shuttle, $\omega$ is the measured resonator frequency, and $\omega xy$ is the measured accelerometer frequency. The gyroscope is configured to measure the rate, $\Omega$.

The velocity current is generated by the differential meshing of the radial edges of the shuttle with the underlying velocity feedback electrodes spaced, h, and disposed radially between ro and ri. This disposition makes the effective value of h affected by curvature of the structure substantially in the same way as the Coriolis electrode. If all of the shown electrodes are used for this purpose, then the value of the velocity current is estimated by:

$$iv = 16 \cdot \varepsilon \cdot (V - Vt) \cdot \left(\frac{ro^2 - ri^2}{h}\right) \cdot \Omega z \qquad \text{Eq. 2}$$

The quantities ro and ri are very tightly defined, so the quotient is/iv, which represents the transduction scale factor, can be used as an estimate of $\Omega$. Given the design values of ro, ri for FIG. 3, the ratio of Coriolis acceleration to velocity signals can be approximated by:

$$\frac{ic}{iv} = \frac{8 \cdot L}{21 \cdot h} \cdot \frac{\omega \cdot \Omega}{\omega xy^2 - \omega^2} \qquad \text{Eq. 3}$$

where $\Omega$ is the applied angular rate including bias terms, L is the outer arc length of a Coriolis electrode, h is the effective substrate gap, $\omega$ is the resonator frequency, and $\omega xy$ is the accelerometer resonance frequency.

In certain embodiments, the variances of L and h are ignored, and L and h are set to predetermined nominal values. In such embodiments, the transduction scale factor can be computed based on measurements of the shuttle and accelerometer resonance frequencies. The shuttle resonance frequency can be measured by driving the shuttles to resonate and then measuring the resonance frequency using a frequency counter. Similarly, the accelerometer resonance frequency can be measured by causing the accelerometer to resonate, e.g., by applying alternating drive signals to the quadrature adjusting electrodes underlying the shuttle, and measuring the resonance frequency based on signals obtained from the Coriolis acceleration electrodes. The quotient can be obtained, for example, by applying iv as an input to an analog-to-digital converter, for example, using principles described in U.S. Pat. No. 5,034,905, which is hereby incorporated herein by reference in its entirety.

In certain embodiments, it may be necessary or desirable to substitute the nominal value of h with a measured value of h, as the value of h can vary from device to device based on such things as spacer oxide thickness and device curvature. The value of h can be estimated based on the quality factor (Q) of the shuttles or accelerometer, since Q is generally affected by the distance between the shuttles and the substrate through aerodynamic effects (i.e., Q is inversely proportional to h).

Q can be measured, for example, using a chirping, sweeping, or curve fitting technique as known in the art. In a phased-lock loop system, Q can be measured, for example, from the frequency shift induced by a 45 degree phase shift switched into the resonance feedback from a tap in the binary divider chain. Alternatively, Q can be measured from the amplitude change induced by known frequency shifts from resonance (e.g., measuring the amplitude of the shuttles at the resonance frequency and also at the resonance frequency+/−5%) or by the reciprocal of the relative −3 dB bandwidth.

The value h when this structure is fabricated in 8 um thick polysilicon over 2 um of spacer oxide is proportional to the following:

$$\frac{Qxy}{\omega xy} \cdot \left(\frac{\omega o}{\omega} - 0.2\right) \qquad \text{Eq. 4}$$

i.e., h=K·Eq. 4, where K is a fixed constant that may be determined through testing. Substituting the value K·Eq. 4 into Eq. 3 provides the following estimate for transduction scale factor:

$$\text{Output} = K \cdot \frac{\omega^2 \cdot \omega xy}{(\omega xy^2 - \omega^2) \cdot (5 \cdot \omega o - \omega)} \cdot \frac{\Omega}{Qxy} \quad \text{Eq. 5}$$

Thus, in this embodiment, the transduction scale factor can be computed based on measurements of the shuttle and accelerometer resonance frequencies and an estimate of h determined through measurement of the Q of the shuttles or accelerometer.

In the above embodiments, the Coriolis acceleration electrodes and the velocity feedback electrodes are configured such that ro and ri are the same for both. It should be noted, however, that this relationship is not a requirement, and the formulas can be adjusted to account for different size electrodes.

Figure 4:
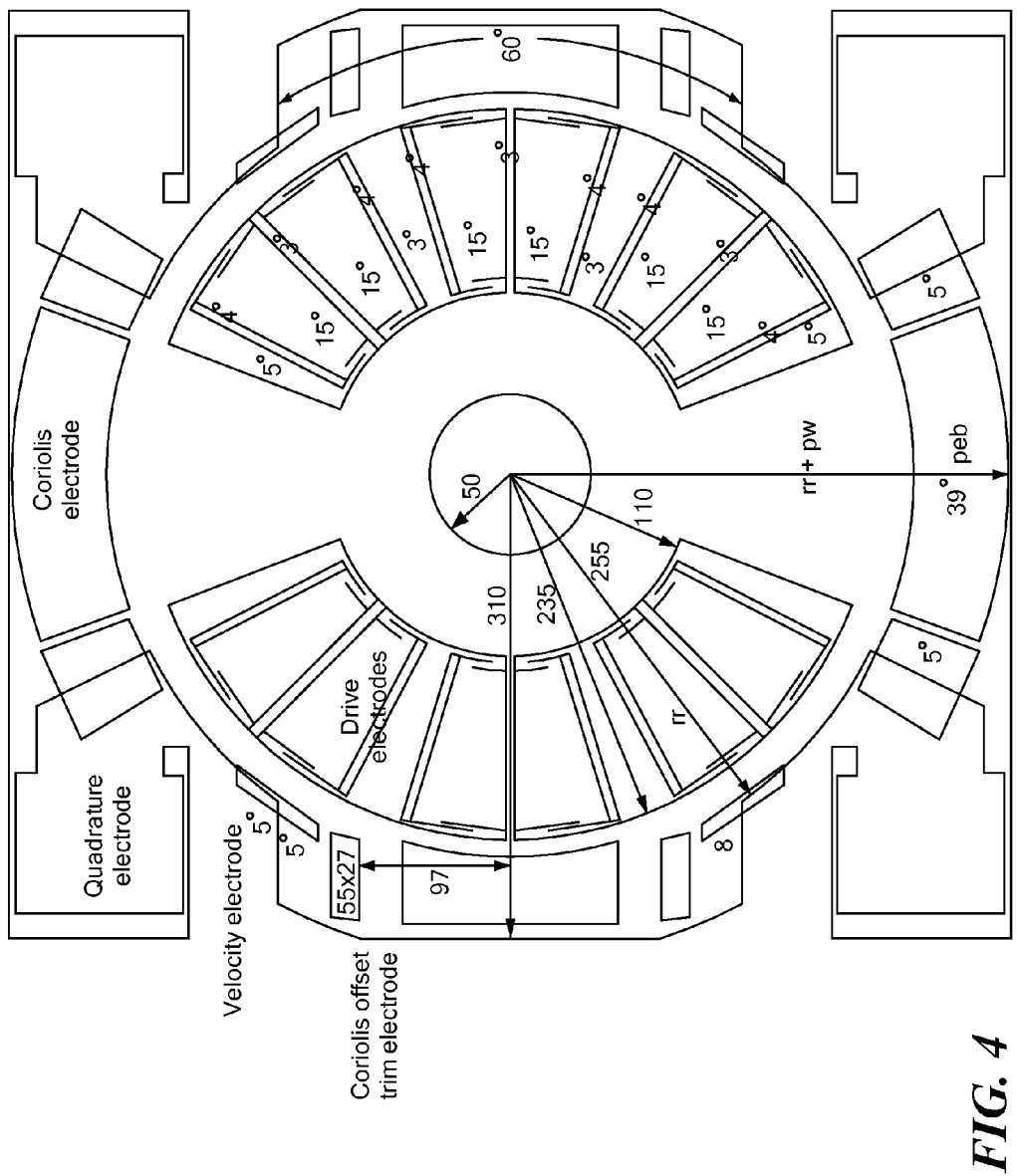
FIG. 4 shows a detailed view of one quadrant of an XY gyroscope in accordance with another embodiment of the present invention.

FIG. 4 shows a more detailed view of one quadrant of an XY gyroscope in accordance with another embodiment of the present invention. In this configuration, the differential Coriolis current of a pair of shuttles can be estimated as follows:

$$ic(\delta) = 2 \cdot 2 \cdot \varepsilon \cdot (V - Vt) \cdot \frac{(rr + pw)^3 - rr^3}{3} \cdot \frac{peb}{h^2} \cdot \frac{2 \cdot \Omega d(\delta) \cdot \Omega \cdot \omega(\delta)}{\omega(\delta)^2 - \omega x(\delta)^2} \quad \text{Eq. 6}$$

where V is the structure voltage, Vt is the amplifier common mode input, SZd is the angular velocity of the shuttle, peb is the Coriolis electrode angle, rr is the electrode inner radius, δ is a mask bias associated with the micromachining, and h is the effective separation of the electrode and structure.

The differential velocity current for the coupled quad is estimated as follows:

$$iv(\delta) = 4 \cdot (V - Vt) \cdot \Omega d(\delta) \cdot \left[4 \cdot \varepsilon \cdot \frac{(rr + 8 \cdot \text{um})^2 - rr^2}{2 \cdot h}\right] \quad \text{Eq. 7}$$

The ratio of Coriolis to velocity signals is therefore given by:

$$\frac{ic(\delta)}{iv(\delta)} = \frac{(rr + pw)^3 - rr^3}{3 \cdot [(rr + 8 \cdot \text{um})^2 - rr^2]} \cdot \frac{peb}{h} \cdot \frac{\omega(\delta) \cdot \Omega y}{\omega(\delta)^2 - \omega x(\delta)^2} \quad \text{Eq. 8}$$

The ratio of Coriolis to velocity signals can be approximated by:

$$\frac{ic}{iv} = \frac{4.16 \cdot peb \cdot rr}{h} \cdot \frac{\omega \cdot \Omega}{\omega^2 - \omega x^2} = 1.12 \cdot \frac{f \cdot R}{f^2 - fx^2} \quad \text{Eq. 9}$$

where Ω is the applied angular rate (R) in deg/sec, ω is the shuttle resonance frequency (f in Hz), and ωx is the accelerometer resonance frequency (fx in Hz).

$$\frac{\text{Output}}{R} = \frac{f \cdot K}{f^2 - fx^2} \quad \text{Eq. 10}$$

As in the embodiment described above, the variances of (peb·rr) and h may be ignored such that the transduction scale factor can be computed based on measurements of the shuttle and accelerometer resonance frequencies.

Also, as in the embodiment described above, it may be necessary or desirable to measure the value of h. As mentioned above, Q can be measured using a variety of techniques. An empirical fit to the structure model gives the following formula for determining the effective "h" in um units. First, a "normalized" Q, Qn, is formed for the composite resonator by Qn=Qz/fz^1.79, where the resonator frequency, fz, is measured in kHZ units. Then, h=3.345*Qn+3.11*Qn^3. The accuracy of the fit is roughly 0.5% for values of h between 1 and 3. The Q for a 45 degree phase shift is given by the corresponding frequency shift, df, as Q=(fz/df)*(pi/8).

Figure 5:
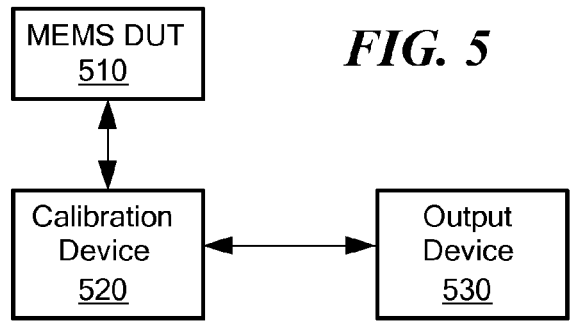
FIG. 5 is a schematic diagram showing a MEMS device calibration system in accordance with an exemplary embodiment of the present invention.

In typical embodiments, in order to calibrate the transduction scale factor, the MEMS device is connected to an external calibration device. FIG. 5 is a schematic diagram showing a MEMS device-under-test (DUT) 510 connected to a calibration device 520, which in turn is connected to an output device 530 such as a display device (the output device may be part of the calibration device 520). The calibration device 520 measures the resonance frequencies of the shuttles and the accelerometer and optionally measures the Q of the shuttles or accelerometer to determine h, and then computes a transduction scale factor value based on those values without physically moving the MEMS device to induce acceleration signals. The calibration device may store the transduction scale factor value in the MEMS device memory for use by the controller. Calibration of the transduction scale factor may be performed multiple times. For example, calibration of the transduction scale factor may be performed prior to capping/packaging of the MEMS device, and the calibration device may store a transduction scale factor value in the MEMS device memory at that time. Later, calibration of the transduction scale factor may be performed after capping/packaging of the MEMS device, e.g., to determine whether the transduction scale factor stored in the MEMS device memory is within an acceptable range. In this regard, the calibration device may determine whether the MEMS device has passed or failed a test and may generate an output on an appropriate output device (e.g., a display or other output device) indicating whether the MEMS device has passed or failed the test.

In embodiments of the present invention, the calibration device includes appropriate circuitry for measuring the resonance frequency of the MEMS device shuttles, measuring the resonance frequency of the MEMS device accelerometer, and producing a transduction scale factor value based on these resonance frequencies. The calibration device may additionally include appropriate circuitry for measuring the Q of the shuttles and/or accelerometer, producing a measured distance value based on the Q, and producing the transduction scale factor value based on the resonance frequencies and the measured distance value. The calibration device may include appropriate circuitry for storing the transduction scale factor value in a memory of the MEMS device and/or for comparing the transduction scale factor value with a previously stored value in the memory of the MEMS device, e.g., to decide whether the MEMS device passes or fails a test. The calibration device may produce an output (e.g., on a display or other output device) indicating whether the MEMS device passes or fails the test.

Figure 6:
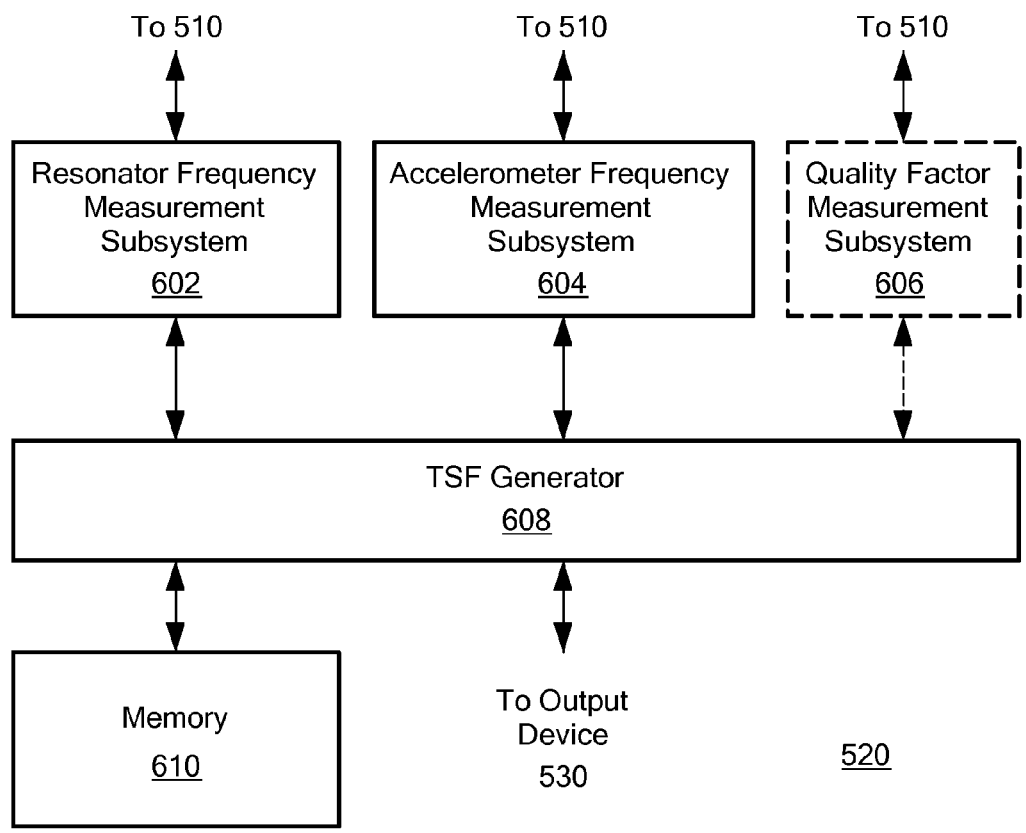
FIG. 6 is a schematic diagram showing the relevant components of the calibration device shown in FIG. 5, in accordance with an exemplary embodiment of the present invention.

FIG. 6 is a schematic diagram showing the relevant components of the calibration device 520 shown in FIG. 5. Among other things, the calibration device 520 includes a first frequency measurement subsystem 602 for measuring the resonance frequency of the resonator (shuttles) of the DUT 510, a second frequency measurement subsystem 604 for measuring the resonance frequency of the accelerometer of the DUT 510, an optional quality factor measurement subsystem 606 for measuring the quality factor of the resonator and/or accelerometer of the DUT 510, a transduction scale factor (TSF) generator 608 for producing a transduction scale factor value based on the measured resonance frequencies and also based on a distance value, which may be a fixed value, e.g., obtained from a memory 610 or a measured distance value derived from a quality factor measurement made by the quality factor measurement subsystem 606. The transduction scale factor generator 608 may output information (e.g., a pass/fail indicator) on output device 530. The various components shown in FIG. 6 may share certain circuitry, e.g., the two frequency measurement subsystems may share a common frequency counter.

Figure 7:
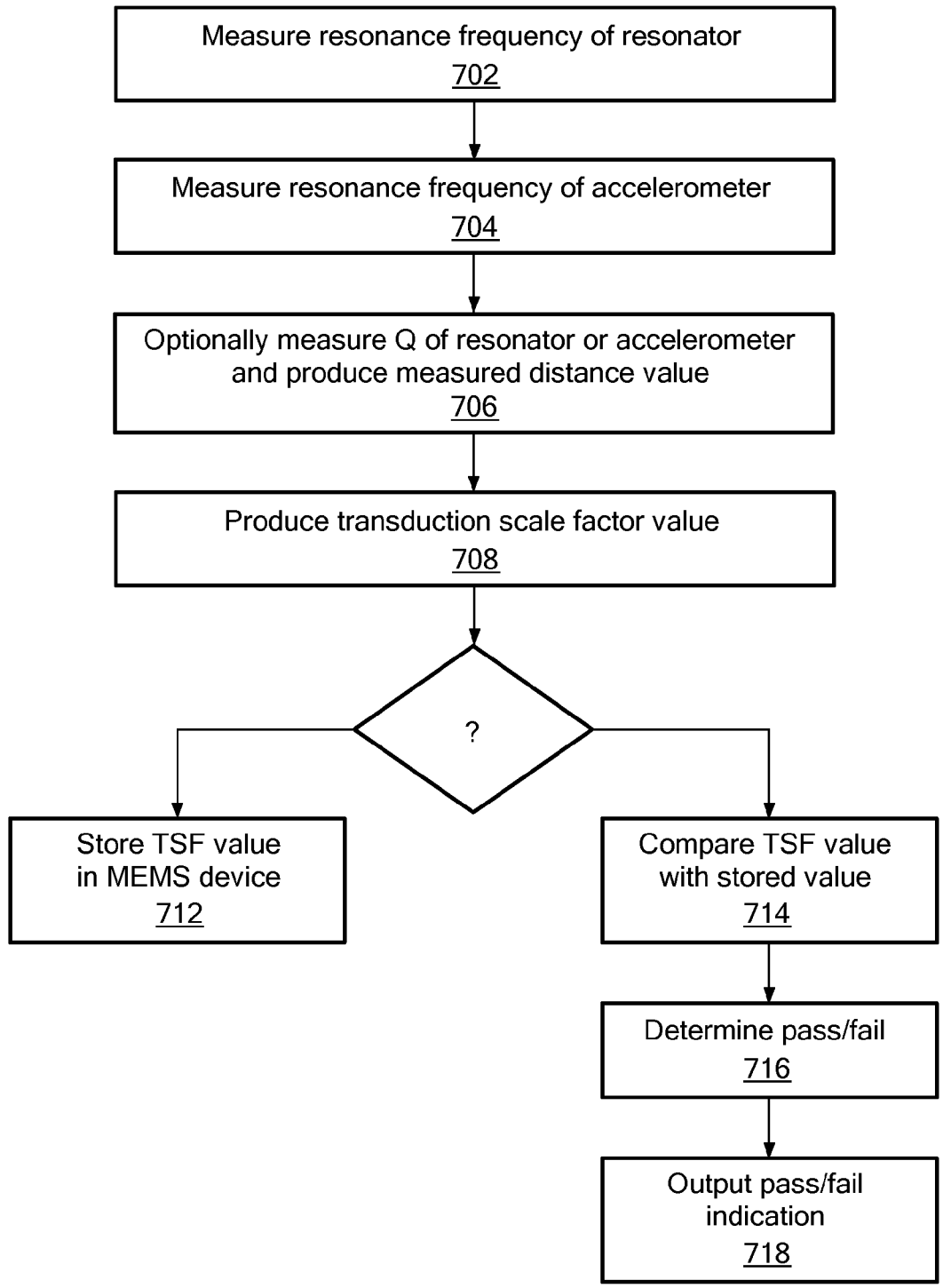
FIG. 7 is a logic flow diagram for the transduction scale factor generator shown in FIG. 6, in accordance with an exemplary embodiment of the present invention.

FIG. 7 is a logic flow diagram for the transduction scale factor generator 608. In block 702, the transduction scale factor generator 608 causes the first frequency measurement subsystem 602 to measure the resonance frequency of the resonator. In block 602, the transduction scale factor generator 608 causes the second frequency measurement subsystem 604 to measure the resonance frequency of the accelerometer. In block 606, the transduction scale factor generator 608 optionally causes the quality factor measurement subsystem 606 to measure the quality factor of the resonator or accelerometer to derive a measured distance value. In block 708, the transduction scale factor generator 608 then produces a transduction scale factor value based on the measured resonance frequencies and a distance value, which may be a fixed distance value or may be the optional measured distance value. The transduction scale factor generator 608 may store the transduction scale factor value in a memory of the DUT 510, in block 712. Alternatively, the transduction scale factor generator 608 may compare the transduction scale factor value with a value previously stored in the DUT 510, in block 714, determine whether the DUT 510 passes or fails a test, in block 716, and output an indicator of whether the DUT 510 passed or failed the test, in block 718.

In embodiments of the present invention, the controller includes appropriate circuitry for operating the MEMS gyroscope, including driving the shuttles based on feedback from the velocity feedback electrodes, sensing Coriolis channel signals via the Coriolis acceleration electrodes.

Circuitry may include discrete components, integrated circuitry (e.g., an Application Specific Integrated Circuit (ASIC)), programmable logic for use with an included programmable logic device (e.g., a Field Programmable Gate Array (FPGA) or other PLD), computer program logic for use with an included processor (e.g., a microprocessor, microcontroller, digital signal processor, or general purpose computer), or any other means including any combination thereof.

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention may be implemented as entirely hardware.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for calibrating a MEMS gyroscope having a resonator and an accelerometer, the resonator including at least one shuttle that resonates in a device plane above an underlying substrate and deflects out-of-plane, the accelerometer configured to sense such out-of-plane motion, the method comprising:
   measuring a resonance frequency of the resonator;
   measuring a resonance frequency of the accelerometer; and
   producing a transduction scale factor value for the MEMS gyroscope based on the resonance frequency of the resonator and the resonance frequency of the accelerometer without physical movement of the gyroscope to measure electrical outputs produced in response to known movements of the gyroscope.

2. A method according to claim 1, wherein measuring the resonance frequency of the resonator comprises:
   inducing movement of the at least one shuttle within the device plane.

3. A method according to claim 1, wherein measuring the resonance frequency of the accelerometer comprises:
   inducing out-of-plane movement of the at least one shuttle.

4. A method according to claim 1, wherein producing the transduction scale factor value comprises:
   producing the transduction scale factor value based on the resonance frequency of the resonator, the resonance frequency of the accelerometer, and a fixed distance value representing the nominal distance between the at least one shuttle and corresponding accelerometer sense electrodes on the underlying substrate.

5. A method according to claim 1, wherein producing the transduction scale factor value comprises:
   measuring a distance between the at least one shuttle and corresponding accelerometer sense electrodes on the underlying substrate to produce a measured distance value; and
   producing the transduction scale factor value based on the resonance frequency of the resonator, the resonance frequency of the accelerometer, and the measured distance value.

6. A method according to claim 5, wherein measuring the distance comprises:
   measuring a quality factor of the resonator; and
   producing the measured distance value based on the measured quality factor of the resonator.

7. A method according to claim 5, wherein measuring the distance comprises:
   measuring a quality factor of the accelerometer; and
   producing the measured distance value based on the measured quality factor of the accelerometer.

8. A method according to claim 1, further comprising:
   storing the transduction scale factor value in a memory of the MEMS device.

9. A method according to claim 1, further comprising:
   comparing the transduction scale factor value with a transduction scale factor value previously stored in a memory of the MEMS device.

10. A method according to claim 9, further comprising:
    determining, based on the comparison, whether the MEMS device passes or fails a test; and
    producing an output indicating whether the MEMS device passes or fails the test.

11. A calibration device for calibrating a MEMS gyroscope having a resonator and an accelerometer, the resonator including at least one shuttle that resonates in a device plane above an underlying substrate and deflects out-of-plane, the accelerometer configured to sense such out-of-plane motion, the calibration device comprising:
    a first frequency measurement subsystem configured to measure a resonance frequency of the resonator;
    a second frequency measurement subsystem configured to measure a resonance frequency of the accelerometer; and
    a transduction scale factor generator configured to produce a transduction scale factor value for the MEMS gyroscope based on the resonance frequency of the resonator and the resonance frequency of the accelerometer without physical movement of the gyroscope to measure electrical outputs produced in response to known movements of the gyroscope.

12. A calibration device according to claim 11, wherein the first frequency measurement subsystem is configured to measure the resonance frequency of the resonator by inducing movement of the at least one shuttle within the device plane.

13. A calibration device according to claim 11, wherein the second frequency measurement subsystem is configured to measure the resonance frequency of the accelerometer by inducing out-of-plane movement of the at least one shuttle.

14. A calibration device according to claim 11, wherein the transduction scale factor generator is configured to produce the transduction scale factor value based on the resonance frequency of the resonator, the resonance frequency of the accelerometer, and a fixed distance value representing the nominal distance between the at least one shuttle and corresponding accelerometer sense electrodes on the underlying substrate.

15. A calibration device according to claim 11, wherein the transduction scale factor generator is configured to measure a distance between the at least one shuttle and corresponding accelerometer sense electrodes on the underlying substrate to produce a measured distance value and produce the transduction scale factor value based on the resonance frequency of the resonator, the resonance frequency of the accelerometer, and the measured distance value.

16. A calibration device according to claim 15, wherein the transduction scale factor generator includes a quality factor measurement subsystem for measuring a quality factor of the resonator and producing the measured distance value based on the measured quality factor of the resonator.

17. A calibration device according to claim 15, wherein the transduction scale factor generator includes a quality factor measurement subsystem for measuring a quality factor of the accelerometer and producing the measured distance value based on the measured quality factor of the accelerometer.

18. A calibration device according to claim 11, wherein the transduction scale factor generator is configured to store the transduction scale factor value in a memory of the MEMS device.

19. A calibration device according to claim 11, wherein the transduction scale factor generator is configured to compare the transduction scale factor value with a transduction scale factor value previously stored in a memory of the MEMS device.

20. A calibration device according to claim 19, wherein the transduction scale factor generator is further configured to determine, based on the comparison, whether the MEMS device passes or fails a test, and to produce an output indicating whether the MEMS device passes or fails the test.

* * * * *